(12) United States Patent
Zhang et al.

(10) Patent No.: US 9,195,906 B2
(45) Date of Patent: Nov. 24, 2015

(54) REGION EXTRACTION FROM OCCUPANCY GRIDS

(71) Applicant: Google Inc., Mountain View, CA (US)

(72) Inventors: Ying Zhang, Cupertino, CA (US); Damon Kohler, Munich (DE); Holger H. Rapp, Munich (DE); Christopher Edward Hoover, Campbell, CA (US)

(73) Assignee: Google Inc., Mountain View, CA (US)

( * ) Notice: Subject to any disclaimer, the term of this patent is extended or adjusted under 35 U.S.C. 154(b) by 81 days.

(21) Appl. No.: 14/202,576

(22) Filed: Mar. 10, 2014

(65) Prior Publication Data

US 2015/0254521 A1    Sep. 10, 2015

(51) Int. Cl.
  *G06K 9/34* (2006.01)
  *G06K 9/46* (2006.01)
  *G06T 7/00* (2006.01)

(52) U.S. Cl.
  CPC .............. *G06K 9/469* (2013.01); *G06T 7/0081* (2013.01)

(58) Field of Classification Search
  None
  See application file for complete search history.

(56) References Cited

U.S. PATENT DOCUMENTS

2008/0306689 A1 * 12/2008 Kourogi et al. ............... 701/217
2012/0195491 A1    8/2012 Zhang et al.
2012/0239191 A1 *  9/2012 Versteeg et al. ............. 700/246

OTHER PUBLICATIONS

Liu et al, "Extracting semantic indoor maps from occupancy grids", Robotics and Autonomous Systems, Jan. 4, 2013.*
Liu et al., "2D Semantic Mapping on Occupancy Grids", Robotics: Proceedings of ROBOTIK 2012; 7th German Conference on, Munich, DE, May 21-22, 2012, p. 1-6.
Archibald et al., "Human Motion Prediction for Indoor Mobile Relay Networks", High Performance Computing and Communications (HPCC), 2011 IEEE 13th International Conference on; Banff, CA, Sep. 2, 2011, Slides 1-16.
Liu et al., Extracting semantic indoor maps from occupancy grids, Robotics and Autonomous Systems, Jan. 4, 2013, ISSN 0921-8890.
Zhang et al., "Walk&Sketch; Create Floor Plans with an RGB-D Camera", ACM International Conference on Ubiquitous Computing; Sep. 5-8, 2012, Pittsburgh, PA, 10 pages.
Archibald et al., "Human Motion Prediction for Indoor Mobile Relay Networks", High Performance Computing and Communications (HPCC), 2011 IEEE 13th International Conference on, Sep. 2, 2011. pp. 1-6.

* cited by examiner

*Primary Examiner* — Phuoc Tran
(74) *Attorney, Agent, or Firm* — Dority & Manning, P.A.

(57) ABSTRACT

Systems and methods for extracting regions from occupancy grids are provided. One example method includes performing a plurality of assignment iterations. Each assignment iteration includes assigning each of a first plurality of cells to one of a plurality of centroids based on a cost formula such that a plurality of regions respectively associated with the plurality of centroids are formed. The region for each centroid comprises all of the cells assigned to such centroid. Each assignment iteration includes reassigning one or more of the first plurality of cells to one or more respective alternate regions. The one or more reassigned cells were included in one or more problem areas of one or more of the plurality of regions. Each assignment iteration includes relocating the plurality of centroids to be the respective means of the plurality of regions. One example system includes computing devices implementing instructions stored on non-transitory computer-readable media.

20 Claims, 7 Drawing Sheets

REGION EXTRACTION FROM OCCUPANCY GRIDS

FIELD

The present disclosure relates generally to region extraction. In particular, the present disclosure is directed to systems and methods for generating an indoor map by extracting regions from an occupancy grid.

BACKGROUND

Many applications currently exist that allow a user to obtain a map of the outdoor spaces of a certain location. For example, a user can employ a mapping application to retrieve a map of a city showing the locations of streets and various points of interest.

However, the mapping applications generally fail to provide any information describing the indoor spaces associated with structures included in the area represented by the map. Therefore, a user is unable to use the mapping application to navigate about an indoor space.

Furthermore, for mapping applications that do provide information describing indoor spaces, such information is generally generated by a human. For example, the indoor map may have been created by a human tracing a floorplan overlaid upon the map. This process is inefficient and prone to error. In particular, human tracings of floorplans are not scalable to generate indoor maps for all structures across a map of significant scale (e.g. a map of a city or of the entire Earth).

In addition, indoor maps describing an indoor space can fail to identify or designate particular areas of the indoor space as discrete regions. For example, human conceptions of indoor space generally divide the space into regions such as rooms, hallways, nooks, closets, or other spaces. Thus, an indoor map that does not designate regions of the indoor space fails to appropriately match human conceptions of such space.

Furthermore, knowledge of regions within the indoor space can be helpful for many other applications, including applications requiring computer or robotic knowledge of regions within the indoor space. For example, robotic navigation, enhanced (e.g. energy efficient) lighting, heating, or air conditioning, or other computing or robotic tasks can benefit from an indoor map specifying particular regions. Therefore, failure of the indoor map to designate regions can inhibit the use of the indoor map for such advanced applications.

SUMMARY

Aspects and advantages of the present disclosure will be set forth in part in the following description, or may be obvious from the description, or may be learned through practice of embodiments of the present disclosure.

One example aspect of the present disclosure is directed to a method for region extraction. The method includes obtaining, by one or more computing devices, an occupancy grid comprising a first plurality of cells. The method includes designating, by the one or more computing devices, a second plurality of cells as a plurality of centroids. The second plurality of cells is a subset of the first plurality of cells. The method includes performing, by the one or more computing devices, a plurality of assignment iterations. Each assignment iteration includes assigning, by the one or more computing devices, each of the first plurality of cells to one of the plurality of centroids based on a cost formula such that a plurality of regions respectively associated with the plurality of centroids are formed. The region for each centroid comprises all of the cells assigned to such centroid. Each assignment iteration includes reassigning, by the one or more computing devices, one or more of the first plurality of cells to one or more respective alternate regions. The one or more reassigned cells were included in one or more problem areas of one or more of the plurality of regions. Each assignment iteration includes relocating, by the one or more computing devices, the plurality of centroids to be the respective means of the plurality of regions.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Figure 1:
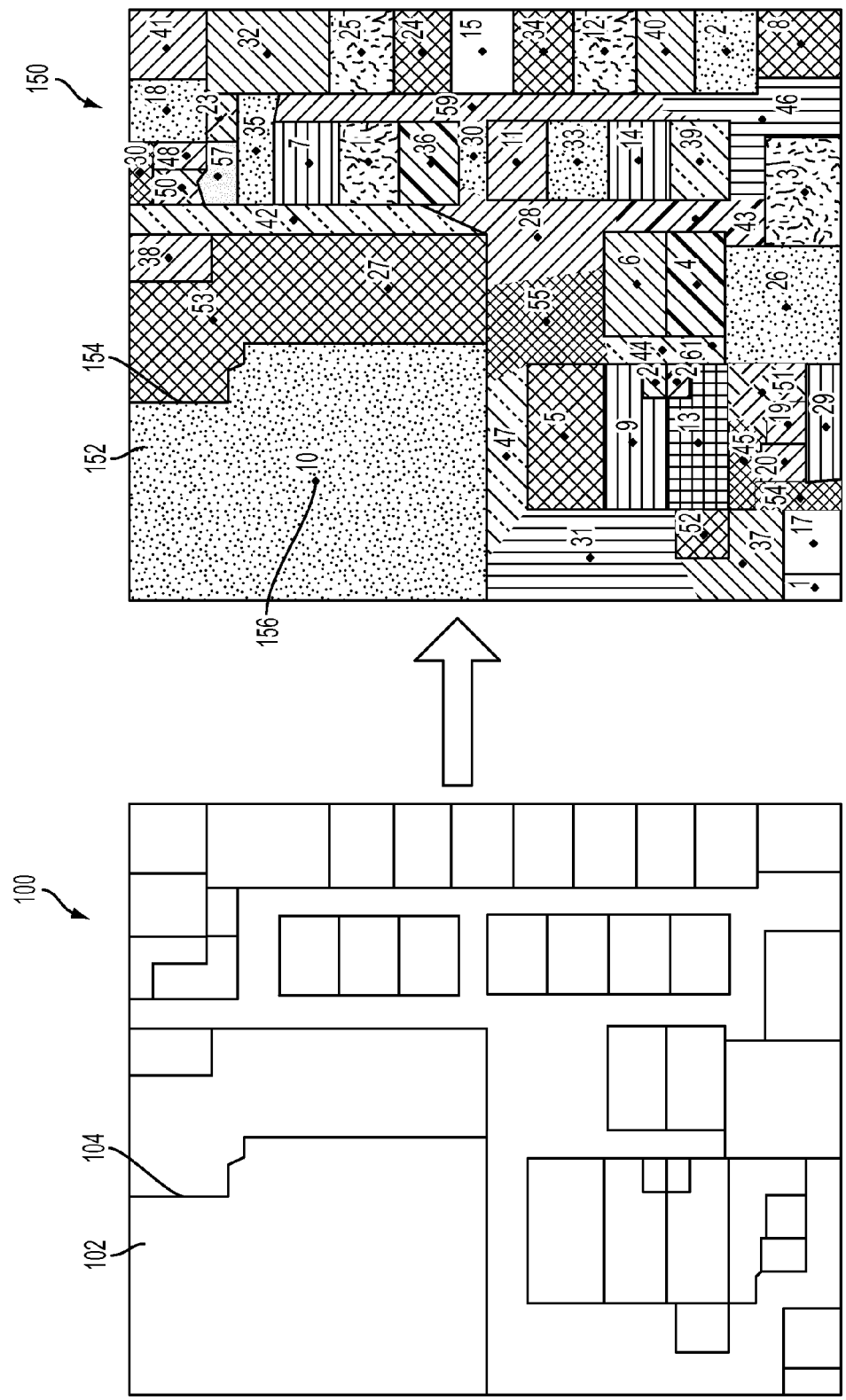
FIG. 1 depicts an example occupancy grid and an example indoor map according to an example embodiment of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Overview

Generally, the present disclosure is directed to systems and methods for generating an indoor map by extracting regions from an occupancy grid. More particularly, many techniques exist for obtaining two or three-dimensional data describing the relative locations of walls or other objects in an indoor space. For example, laser ranging, sonar ranging, image analysis (e.g. structure from motion, feature matching, etc.), robotic exploration, use of RGBD (or RGBZ) cameras, or other suitable techniques or combinations of such techniques can be used to generate data describing the indoor space. This data can be used to generate or supplement a two-dimensional representation of the indoor space data called an occupancy grid. In particular, an occupancy grid can be spatially divided into a plurality of cells and can provide, for each cell, a probability that such cell is occupied by an object (e.g. a wall). Thus, an occupancy grid can generally provide an indication of a floorplan associated with the indoor space. The systems and methods of the present disclosure can be implemented to identify a plurality of regions (e.g. rooms, hallways, or nooks) evidenced by the occupancy grid. In particular, one aspect of the present disclosure is directed to an iterative method in which each iteration includes assigning each cell of the occupancy grid to one of a plurality of centroids based on a cost formula, thereby forming a plurality of regions respectively associated with the plurality of centroids. The centroid for each region can then be relocated to reflect the mean of its respective region. By performing a plurality of assignment iterations, the methods of the present disclosure can converge upon assigned regions that best correspond to human perceptions of spatial divisions of a floorplan. The knowledge of particular regions of the floorplan obtained according to the present disclosure can be used for many different purposes, including for example, detection of doors and windows, region connectivity, robotic navigation, pathway prediction, semantic representations of floorplans, or other functions or applications.

Thus, the systems and method of the present disclosure can be performed to extract regions from an occupancy grid. The occupancy grid can include a plurality of cells respectively representing discrete spatial areas or volumes. Each cell can have an occupancy value that indicates an occupancy probability that an object (e.g. a wall) occupies the area or volume corresponding to such cell.

A system implementing the present disclosure can retrieve from memory or otherwise obtain an occupancy grid and then, in some implementations, perform one or more preprocessing actions. As an example, in the instance that the occupancy grid is an image, preprocessing the occupancy grid can include rotating the image to match perceived notions of floorplan orientation and/or inverting the image colors so that free spaces are represented in black and obstacles represented in white (or vice versa).

As another example, preprocessing the occupancy grid can include thresholding the occupancy probabilities of the grid cells to a binary system. For example, in the instance that the occupancy grid is an image with the occupancy probabilities for particular cells expressed in the form of a grayscale value (e.g. 0 to 256), cells having values less than a threshold value (e.g. 126) can be set to zero while cells having values greater than the threshold value can be set to 256.

As another example, preprocessing the occupancy grid can include performing a dilation technique and/or performing an erosion technique with respect to the occupancy grid. Other suitable image processing techniques may be used as well.

As yet another example, preprocessing the occupancy grid can include removing one or more occupied components having a length less than a threshold value. For example, occupied components can be groups of cells that are connected (e.g. adjacent) and occupied. If a length of an occupied component is less than a threshold value (e.g. 3 cells), then the occupied component can be removed (e.g. transformed into unoccupied space). In such fashion, occupied components that may represent false positives due to laser spill or other noise can be reduced.

In further implementations, preprocessing can include removing only those small occupied components that are located in a cluster of similar components, a situation commonly resulting from laser spill. In yet further implementations, preprocessing can include removing occupied components having an orientation that is inconsistent with surrounding occupied components. Other smoothing or approximation techniques can be performed as well.

A plurality of centroids can be initialized at certain cells of the occupancy grid. For example, a random number or a predetermined number of centroids can be initialized. The spacing of the initialized centroids can also be randomized or can be evenly distributed in one or more patterns. The initialized centroids can serve as a starting configuration which can be further refined over a plurality of assignment iterations.

In particular, after initializing the plurality of centroids, a system implementing the present disclosure can perform a plurality of assignment iterations. As an example, each assignment iteration can include assigning each unoccupied cell of the occupancy grid to one of the plurality of centroids based on a cost formula. For example, each cell can be assigned to centroid associated with the minimum respective cost for such cell.

The cost formula can provide a cost for each pair of cell and centroid based on one or more variables. For example, the cost formula can be based on whether a line of sight exists between the cell and the centroid (e.g. whether any occupied cells are traversed by a line extending form the cell to the centroid). As other examples, the cost formula can be based on a distance between the cell and the centroid, a number of walls existing between the cell and the centroid (e.g. the number of occupied cells traversed by a line extending form the cell to the centroid), the assignments of neighboring cells, or other suitable parameters.

Assigning each of the cells of the occupancy grid to one of the centroids can form a plurality of regions respectively corresponding to the plurality of centroids. In particular, the region for each centroid can include all of the cells currently assigned to such centroid.

According to an aspect of the present disclosure, each assignment iteration can further include refining one or more regions by identifying problem areas of one or more regions and then reassigning the cells included in such regions to an alternate region. For example, a problem area of a region can be an area that is disconnected from the centroid (e.g. all pathways from the problem area to the centroid traverse at least one other region or an occupied component).

As another example, a problem area of a region can be an area that is defined by two or more open and connected boundary lines. For example, boundary lines between two different regions that do not abut an occupied component can be considered "open." If an area includes two open boundary lines that are connected (a situation commonly resulting from available line of sight from one room into another due to an open doorway), then it can be identified as a problem area.

The cells included in a problem area can be reassigned to an alternate region/centroid. In some implementations, each cell included in an identified problem area can be reassigned to the closest alternative region to which a line of sight is available from such cell. In such fashion, region contours can be simplified to remove open spikes, disconnected regions, or other issues.

After the cells have been assigned to a particular centroid and region, the centroid for each region can be relocated. As an example, the centroid of a region can be relocated to correspond to the mean of such region. For example, the mean of each region can be a geographic mean or an arithmetic mean of the locations of all cells assigned to such region. In some implementations, the arithmetic mean can include weightings according to costs associated with the cells or other parameters.

Thus, by iteratively assigning cells to centroids and then relocating the centroids based on such assignments, the method can iteratively converge upon a solution that minimizes the aggregate cost associated with all cells of the occupancy grid.

Furthermore, according to another aspect of the present disclosure, each assignment iteration can include analyzing each of the plurality of regions to determine whether one or more of the plurality of regions correspond to a detected room. In particular, in some implementations, a region can correspond to a detected room when enough criteria is satisfied to indicate that the region is a high quality representation of a room of the indoor location being mapped.

As an example, analyzing each of the plurality of regions to determine whether a room has been detected can include determining one or more of an open line ratio, an open boundary length ratio, and/or an area-to-perimeter ratio for each of the plurality of regions. For example, the open line ratio can compare the number of open boundary lines associated with the region to a total number of boundary lines associated with the region; the open boundary length ratio can compare an aggregate length of the open boundary lines associated with the region to an aggregate length of all boundary lines associated with the region; and the area-to-perimeter ratio can compare the area of the region to the perimeter length of the region.

In some implementations, regions can be determined as corresponding to detected rooms if one or more of the above noted parameters favorably compare to respective threshold values. For example, a small open line ratio, a small open boundary length ratio, and a large area-to-perimeter ratio can generally indicate that a region should be considered as corresponding to a detected room.

As another example, analyzing each of the plurality of regions to determine whether a room has been detected can include determining for each of the plurality of regions a number of iterations for which the centroid for such region has not been relocated. For example, if the centroid of a region has not been relocated over a significant number of iterations, then the region is stable and likely corresponds to a detected room. However, other measures of region stability can be used as well.

Once a region that corresponds to a detected room has been identified, the cell assignments associated with that region can be locked. For example, in future iterations, the cells currently assigned to such region cannot be reassigned. In some implementations, detected regions can be locked by storing and removing them from further consideration so that future iterations require less processing.

According to another aspect of the present disclosure, each assignment iteration can include determining whether to merge two of the plurality of regions based on one or more criteria. As an example, the one or more criteria can include whether the two centroids respectively associated with the two regions share a line of sight.

As another example, the merging criteria can include whether a percentage of cells assigned to the two regions that do not have a line of sight is below a threshold number. For example, the line of sight can be to the two current centroids of the regions or to a midpoint between the two centroids of the regions. Alternatively or additionally, a raw number of cells having no line of sight can be used instead of a percentage.

As yet another example, the criteria upon which it is determined whether to merge two of the regions can include whether all of a plurality of boundary cells associated with the two regions have a line of sight to a midpoint between the two centroids of the region. For example, if all cells that are on a boundary of either of the two regions have a line of sight to the midpoint between the two centroids, then the two regions are likely portions of a single room and, therefore, can be merged.

If it is determined that two regions should be merged, then, in some implementations, the midpoint between the two centroids of the two regions can be designated as the centroid for both regions and all cells of the two regions can be assigned to such new midpoint. However, in other implementations, the centroid of the new merged region can be determined in other fashions.

According to yet another aspect of the present disclosure, each assignment iteration can further include determining whether to introduce a new centroid based on one or more criteria. As an example, the one or more criteria can include an aggregate cost associated with all of the plurality of regions. For example, the aggregate cost associated with all of the plurality of regions can be based in part on a number of cells that do not have a line of sight to the centroid to which they are respectively assigned.

In particular, in some implementations, the aggregate cost can be the sum of a plurality of new centroid costs respectively associated with the plurality of regions. For example, the new centroid cost associated with each region can be the number of cells included in such region that do not have a line of sight to the region centroid multiplied by the cost associated with the cell in such region having the highest cost as determined according to the cost formula.

Thus, in some implementations, if the aggregate cost is greater than a threshold value, then it can be determined that a new centroid should be added. However, in other implementations a new centroid can be added based on other criteria or can be added at each iteration as a matter of course.

If it is determined that a new centroid should be added, then the new centroid can be initialized and can affect the assignment of cells at the next assignment iteration. As an example, in some implementations, the new centroid can be added by identifying the region having the greatest new centroid cost. The cell having the greatest cost within such identified region can be designated as the new centroid.

It will be appreciated that the determinations as to whether to merge two regions and whether to add a new centroid may or may not be sequential in nature. As an example, in some implementations, an artificial intelligence search technique, such as, for example, branch and bound, can be employed to fan out different results as a tree. A preferred result of the search technique can then be identified and implemented.

According to another aspect of the present disclosure, the assignment iterations can be performed until the region assignments converge upon a satisfactory result or a minimized cost (e.g. continued iterations will not result in significant enhancement of region extraction). Thus, for example, each assignment iteration can include determining whether to cease perform assignment iterations (e.g. exit the iterative loop) based on an improvement value. For example, the improvement value can describe an iteration-over-iteration reduction in cost associated with one or more cells of the occupancy grid (e.g. a reduction resulting from the most recently performed assignment iteration).

As an example, in some implementations, the improvement value can equal or otherwise be based on an absolute value of the cost associated with the cell having received the largest cost value according to the cost formula in the most recent assignment iteration minus the cost associated with the cell having received the largest cost value according to the cost formula in the penultimate assignment iteration.

Thus, if the improvement value is less than a threshold value, then a system implementing the present disclosure can elect to cease performing assignment iterations. In such fashion, when consecutive assignment iterations fail to produce improved cell assignment costs, it can be assumed that the method has converged upon a satisfactory result. However, other methods for determining when to cease performing iterations can be used as well, including, for example, various formulations of the improvement value, a moving average of the improvement value, or simply performing a predetermined number of iterations.

Thus, for example, in addition to determining whether the improvement value is less than the threshold value, it can also be determined if the system has performed a maximum number of iterations. If either condition is satisfied, then the system can elect to cease performing assignment iterations.

Once the system has ceased performing assignment iterations, the most recent set of cell assignments and regions of the occupancy grid can be output as an indoor map having a plurality of designated regions. For example, each cell of the map can have a region index from 1 to N for N regions or a 0 representing occupied space (e.g. obstacles).

Thus, the systems and methods of the present disclosure can be implemented to automatically extract regions from an occupancy grid and generate an indoor map with a plurality of designated regions. The resulting indoor map and regions can then be used for many different purposes, including, for example, detection of doors and windows, region connectivity, robotic navigation, pathway prediction, semantic representations of floorplans, or other functions.

Example Occupancy Grid and Indoor Map

With reference now to the FIGS., example embodiments of the present disclosure will be discussed in further detail. FIG. 1 depicts an example occupancy grid 100 and an example indoor map 150 according to an example embodiment of the present disclosure. In particular, the indoor map 150 has been generated from the occupancy grid 100 by a system implementing the present disclosure.

More particularly, many techniques exist for obtaining two or three-dimensional data describing the relative locations of walls or other objects in an indoor space. For example, laser ranging, sonar ranging, image analysis (e.g. structure from motion, feature matching, etc.), robotic exploration, use of RGBD (or RGBZ) cameras, or other suitable techniques or combinations of such techniques can be used to generate data describing the indoor space. This data can be used to generate or supplement a two-dimensional representation of the indoor space data called an occupancy grid (e.g. occupancy grid 100).

As an example, occupancy grid 100 can be spatially divided into a plurality of cells and can provide, for each cell, a probability that such cell is occupied by an object (e.g. a wall). Thus, occupancy grid 100 can generally provide an indication of a floorplan associated with the indoor space.

In particular, occupancy grid 100 visually represents cells that are probably unoccupied in white, while visually representing cells that are probably occupied in black. For example, cell 102 is indicated as probably unoccupied while cell 104 is indicated as probably occupied.

In addition, although occupancy grid 100 is two-dimensional in nature, the systems and methods of the present disclosure can, by one of skill in the art in light of the present disclosure, be adapted for application to occupancy grids having three-dimensions (e.g. having cells representing a particular volume).

According to aspects of the present disclosure, occupancy grid 100 can be used to generate the indoor map 150. In particular, indoor map 150 can provide, for each cell of the map 150, a region index from 1 to N for N regions or a 0 representing occupied space (e.g. obstacles).

As an example, cell 152 can be assigned to a region, such as region 10, as shown in FIG. 1. Therefore, indoor map 150 can provide a region index of 10 for cell 152. As cell 154 is occupied, indoor map 150 can provide a 0 for cell 154.

Each region of the indoor map 150 can correspond to all of the cells assigned to such region. Furthermore, as will be discussed further later, each region can have a centroid. For example, region 10 has a centroid at cell 156.

Example Methods

Aspects of the present disclosure are directed to methods for extracting regions from an occupancy grid. In particular, aspects of the present disclosure are directed to iterative methods in which each iteration includes assigning each cell of the occupancy grid to one of a plurality of centroids based on a cost formula.

Figure 2:
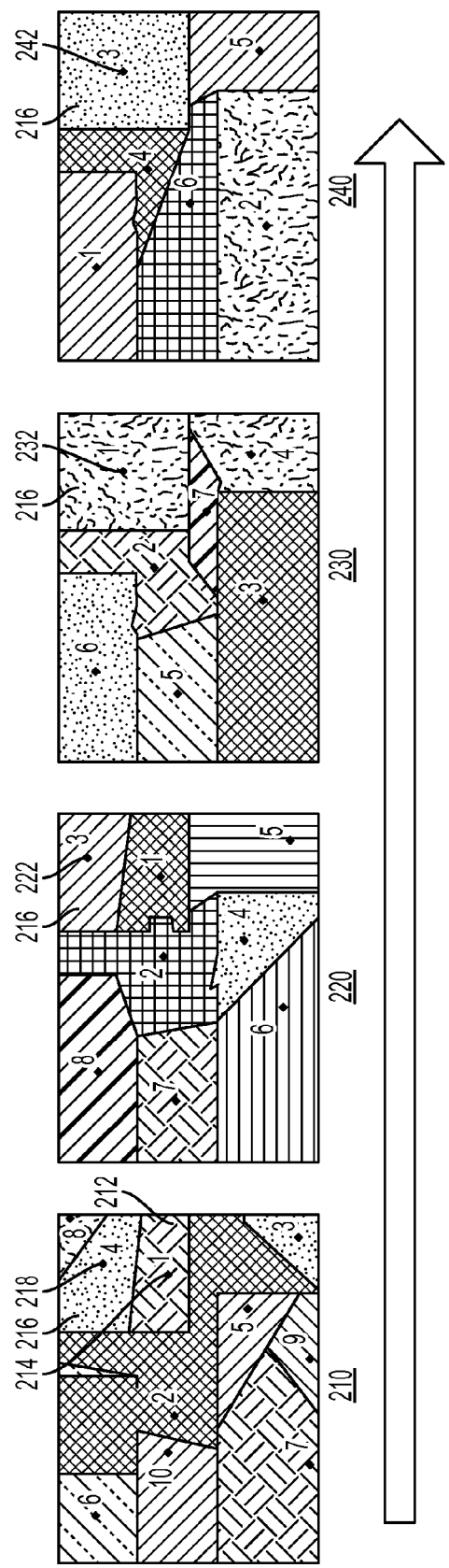
FIG. 2 depicts a plurality of example assignment iterations according to an example embodiment of the present disclosure.

As an example, FIG. 2 depicts a plurality of example assignment iterations according to an example embodiment of the present disclosure. More particularly, FIG. 2 depicts generation of an indoor map over a series of assignment iterations. Therefore, the indoor map is revised from a first state 210 at a first iteration, to a second state 220 at a second iteration, to a third state 230 at a third iteration, to a fourth state 240 at a fourth iteration.

More particularly, as noted above, at each iteration can include assigning each cell of the occupancy grid to one of a plurality of centroids based on a cost formula, thereby forming a plurality of regions respectively associated with the plurality of centroids. As an example, at state 210 cell 212 has been assigned to region 1, which has a centroid at cell 214. Likewise, cell 216 has been assigned to region 4, which has a centroid at cell 218.

Furthermore, each iteration can include relocating the centroid for each region to reflect the mean of its respective region. As an example, at state 220, cell 216 has been reassigned to region 3, which has a centroid at cell 222; at state 230, cells 216 has been reassigned to region 1, which has a centroid at cell 232; and at state 240, cell 216 has been reassigned to region 3, which has a centroid at cell 242.

Thus, by performing a plurality of assignment iterations, the methods of the present disclosure can continually revise the regions and their centroids to converge upon assigned regions that best correspond to human perceptions of spatial divisions of a floorplan. As an example, as can be seen from FIG. 2, the regions at state 240 correspond much more closely to a human perception of the indoor space depicted by the indoor maps of FIG. 2 than do the regions at state 210.

Figure 3:
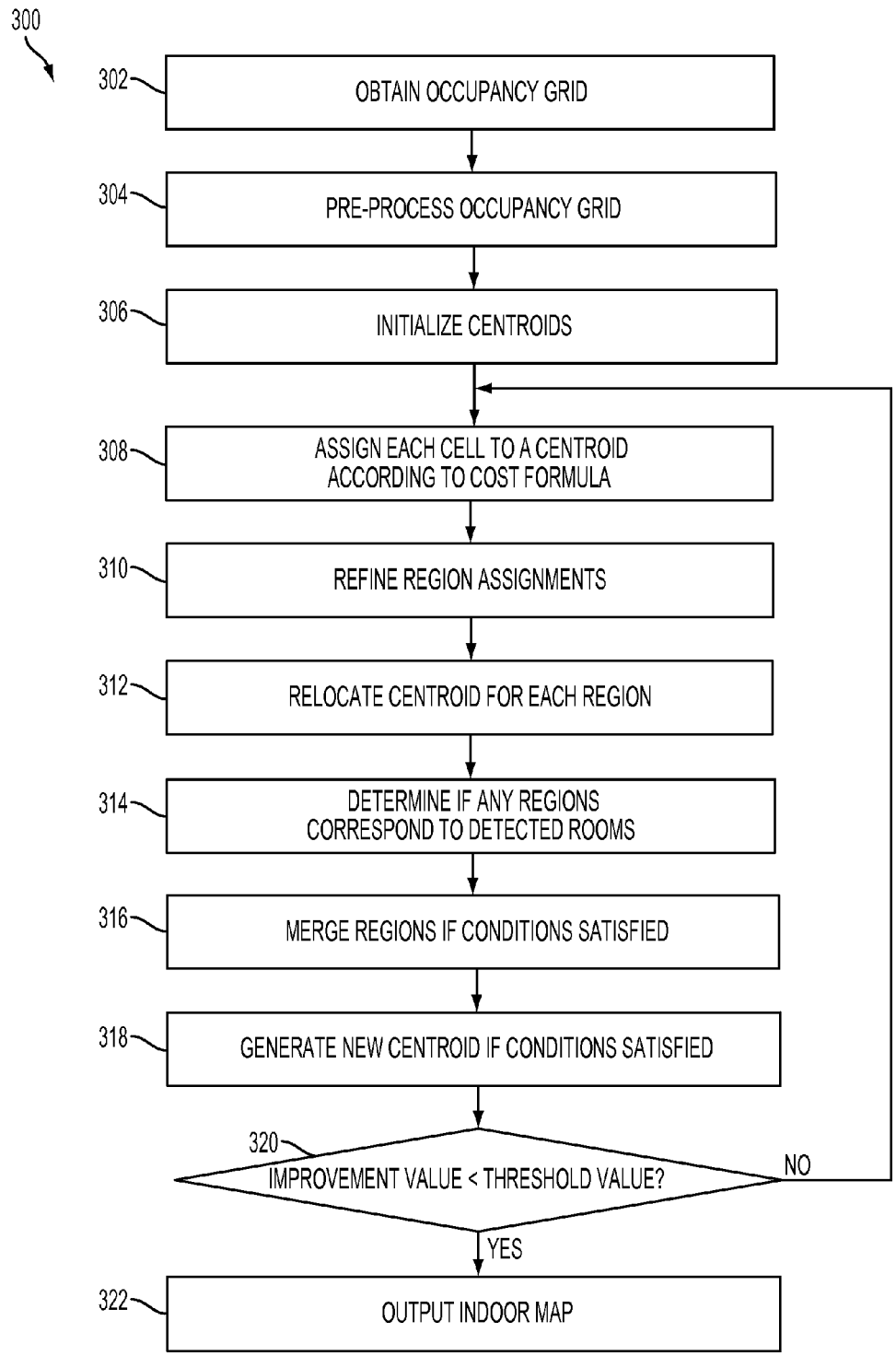
FIG. 3 depicts a flow chart of an example method for extracting regions according to an example embodiment of the present disclosure.

FIG. 3 depicts a flow chart of an example method (300) for extracting regions according to an example embodiment of the present disclosure. Method (300) can be implemented by any suitable computing system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of method (300) can be omitted, rearranged, combined, and/or adapted in various ways without deviating from the scope of the present disclosure.

At (302) a occupancy grid can be obtained. For example, a system implementing the present disclosure can retrieve the occupancy grid from memory. In other implementations, a precursor of the occupancy grid is obtained at (302) and the one or more preprocessing actions performed at (304) can transform the precursor into an occupancy grid.

At (304) one or more preprocessing actions can be performed with respect to the occupancy grid obtained at (302). As an example, in the instance that the occupancy grid obtained at (302) is formatted as an image, preprocessing the occupancy grid at (304) can include rotating the image to match perceived notions of floorplan orientation and/or inverting the image colors so that free spaces are represented in white and obstacles represented in black (or vice versa).

Figure 4A:
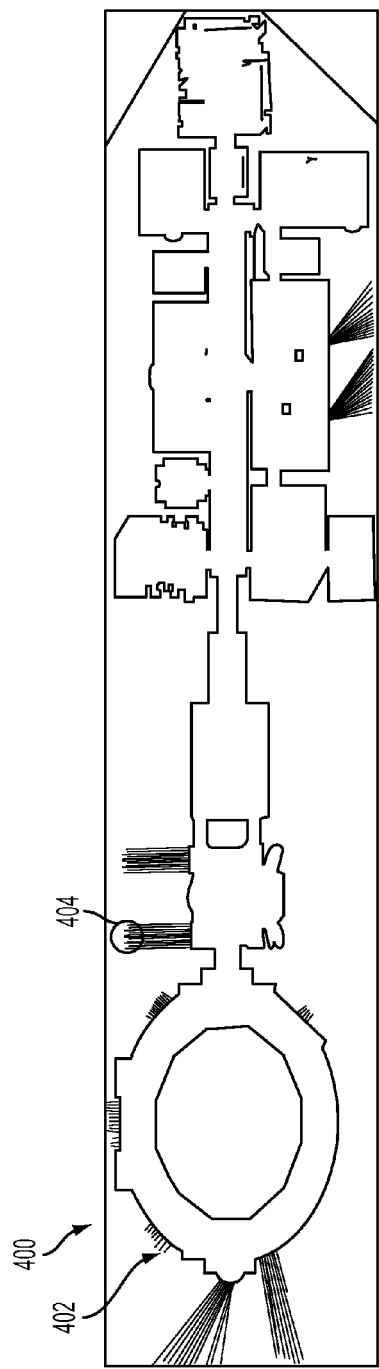
FIG. 4A depicts an example image of a floorplan according to an example embodiment of the present disclosure.
Figure 4B:
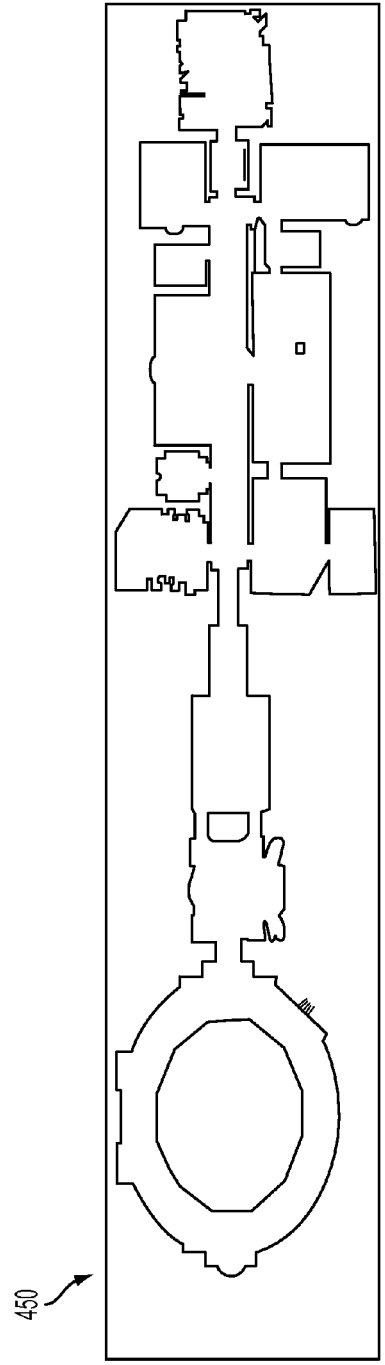
FIG. 4B depicts an example occupancy grid according to an example embodiment of the present disclosure.

As an example, FIG. 4A depicts an example image 400 of a floorplan according to an example embodiment of the present disclosure. FIG. 4B depicts an example occupancy grid 450 according to an example embodiment of the present disclosure. In particular, according to aspects of the present disclosure, image 400 can be preprocessed to obtain occupancy grid 450.

Referring again to FIG. 3, preprocessing the occupancy grid at (304) can include thresholding the occupancy probabilities of the grid cells to a binary system. For example, in the instance that the occupancy grid is an image with the occupancy probabilities for particular cells expressed in the form of a grayscale value (e.g. 0 to 256), cells having values less than a threshold value (e.g. 126) can be set to zero while cells having values greater than the threshold value can be set to 256. Other threshold values can be used as well to modify the strength of evidence required to designate a cell as occupied.

As another example, preprocessing the occupancy grid at (304) can include performing a dilation technique and/or performing an erosion technique with respect to the occupancy grid.

As yet another example, preprocessing the occupancy grid at (304) can include removing one or more occupied components having a length less than a threshold value. For example, occupied components can be groups of cells that are connected (e.g. adjacent) and occupied. If a length of an occupied component is less than a threshold value (e.g. 3 cells), then the occupied component can be removed (e.g. transformed into unoccupied space). In such fashion, occupied components that may represent false positives due to laser spill or other noise can be reduced.

As an example, referring to FIGS. 4A and 4B, image 400 includes an occupied component 402 having a relatively small length. In particular, occupied component 402 may have been included in image 400 due to laser spill or other noise. Thus, preprocessing image 400 can include removing occupied component. Therefore, occupancy grid 450 does not include occupied component 402.

Referring again to FIG. 3, preprocessing at (304) can, in some implementations, include removing only those small occupied components that are located in a cluster of similar components, a situation commonly resulting from laser spill.

As an example, referring to FIGS. 4A and 4B, image 400 includes a cluster 404 of small occupied components. For example, cluster 404 may have resulted from laser spill or other forms of noise. Thus, preprocessing image 400 can include removing the occupied components included in cluster 404. Therefore, occupancy grid 450 does not include the occupied components included in cluster 404.

Referring again to FIG. 3, in yet further implementations, preprocessing at (304) can include removing occupied components having an orientation that is inconsistent with surrounding occupied components. Other smoothing or approximation techniques can be performed as well.

At (306) a plurality of centroids can be initialized at certain cells of the occupancy grid. For example, a random number or a predetermined number of centroids can be initialized. The spacing of the initialized centroids can also be randomized or can be evenly distributed in one or more patterns. The initialized centroids can serve as a starting configuration which can be further refined.

At (308) each unoccupied cell of the occupancy grid can be assigned to one of the plurality of centroids based on a cost formula. For example, each cell can be assigned to centroid associated with the minimum respective cost for such cell.

The cost formula can provide a cost for each pair of cell and centroid based on one or more variables. For example, the cost formula can be based on whether a line of sight exists between the cell and the centroid (e.g. whether any occupied cells are traversed by a line extending form the cell to the centroid). As other examples, the cost formula can be based on a distance between the cell and the centroid, a number of walls existing between the cell and the centroid (e.g. the number of occupied cells traversed by a line extending form the cell to the centroid), the assignments of neighboring cells, or other suitable parameters.

Assigning each of the cells of the occupancy grid to one of the centroids can form a plurality of regions respectively corresponding to the plurality of centroids. In particular, the region for each centroid can include all of the cells currently assigned to such centroid.

At (310) the regions generated at (308) can be refined. For example, at (310) one or more problem areas of one or more regions can be identified and the cells included in such regions can be reassigned to an alternate region.

As an example, a problem area of a region can be an area that is disconnected from the centroid (e.g. all pathways from the problem area to the centroid traverse at least one other region or an occupied component).

Figure 5B:
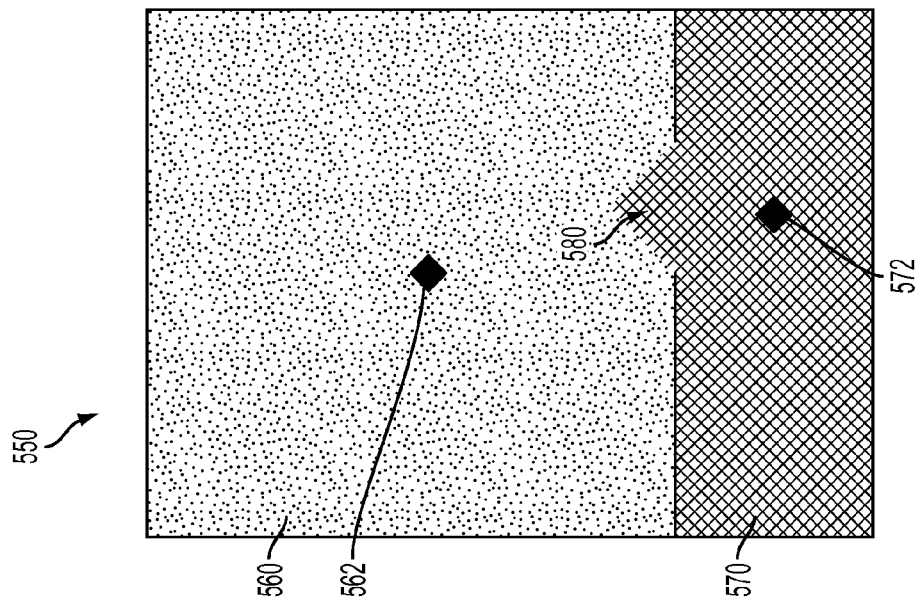
FIG. 5B depicts an example indoor map according to an example embodiment of the present disclosure.
Figure 5A:
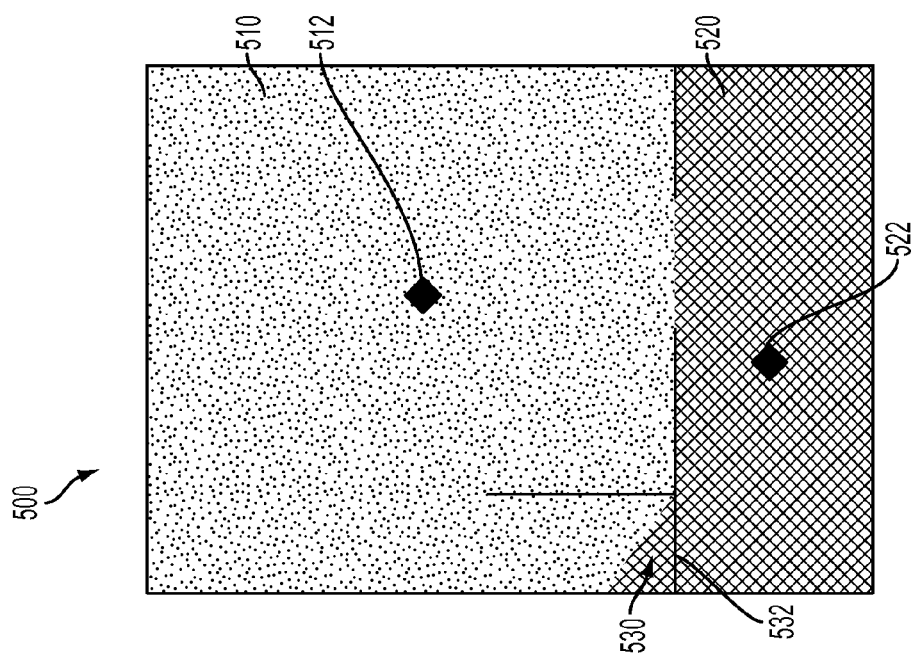
FIG. 5A depicts an example indoor map according to an example embodiment of the present disclosure.

As an example, FIG. 5A depicts an example indoor map 500 according to an example embodiment of the present disclosure. In particular, indoor map 500 has two regions, region 510 and region 520. Region 510 has a centroid at cell 512. Region 520 has a centroid at 522.

Region 520 includes a problem area 530. In particular, problem area 530 is disconnected from centroid 522 because the cells included in problem area 530 must cross at least one wall 532 or other region 510 to reach the centroid.

Therefore, according to an aspect of the present disclosure, each of the cells included in problem area 530 can be reassigned to an alternate region/centroid. For example, in some implementations, each cell included in problem area 530 can be reassigned to the closest alternative region to which a line of sight is available from such cell, which, as shown in FIG. 5A is region 510. In some implementations, the closest alternative regions can be identified by spiraling outward from the cell to be reassigned on a cell-by-cell basis until an alternative region that satisfies any reassignment requirements is identified.

As another example, referring again to FIG. 3, a problem area of a region to be reassigned can be an area that is defined by two or more open and connected boundary lines. For example, boundary lines between two different regions that do not abut an occupied component can be considered "open." If an area includes two open boundary lines that are connected (a situation commonly resulting from available line of sight from one room into another due to an open doorway), then it can be identified as a problem area.

As an example, FIG. 5B depicts an example indoor map 550 according to an example embodiment of the present disclosure. In particular, indoor map 550 has two regions, region 560 and region 570. Region 560 has a centroid at cell 562. Region 570 has a centroid at 572.

Region 570 includes a problem area 580. In particular, problem area 580 is defined by two or more open and connected boundary lines.

Therefore, according to an aspect of the present disclosure, each of the cells included in problem area 580 can be reassigned to an alternate region/centroid. For example, in some implementations, each cell included in problem area 580 can be reassigned to the closest alternative region to which a line of sight is available from such cell, which, as shown in FIG. 5B is region 560. In some implementations, the closest alternative regions can be identified by spiraling outward from the cell to be reassigned on a cell-by-cell basis until an alternative region that satisfies any reassignment requirements is identified.

Referring again to FIG. 3, at (312) the centroid for each region can be relocated. As an example, the centroid of a region can be relocated to correspond to the mean of such region. For example, the mean of each region can be a geographic mean or an arithmetic mean of the locations of all cells assigned to such region. In some implementations, the arithmetic mean can include weightings according to costs associated with the cells or other parameters.

At (314) each of the plurality of regions can be analyzed to determine whether one or more of the plurality of regions correspond to a detected room. In particular, in some implementations, a region can correspond to a detected room when enough criteria is satisfied to indicate that the region is a high quality representation of a room of the indoor location being mapped.

As an example, analyzing each of the plurality of regions to determine whether a room has been detected at (314) can include determining one or more of an open line ratio, an open boundary length ratio, and/or an area-to-perimeter ratio for each of the plurality of regions. For example, the open line ratio can compare the number of open boundary lines associated with the region to a total number of boundary lines associated with the region; the open boundary length ratio can compare an aggregate length of the open boundary lines associated with the region to an aggregate length of all boundary lines associated with the region; and the area-to-perimeter ratio can compare the area of the region to the perimeter length of the region.

In some implementations, regions can be determined as corresponding to detected rooms if one or more of the above noted parameters favorably compare to respective threshold values. For example, a small open line ratio, a small open boundary length ratio, and a large area-to-perimeter ratio can generally indicate that a region should be considered as corresponding to a detected room.

As another example, analyzing each of the plurality of regions to determine whether a room has been detected can include determining for each of the plurality of regions a number of iterations for which the centroid for such region has not been relocated. For example, if the centroid of a region has not been relocated over a significant number of iterations, then the region is stable and likely corresponds to a detected room. However, other measures of region stability can be used as well.

Once a region that corresponds to a detected room has been identified, the cell assignments associated with that region can be locked. For example, in future iterations, the cells currently assigned to such region cannot be reassigned. In some implementations, detected regions can be locked by storing and removing them from further consideration so that future iterations require less processing.

At (316) it can be determined whether to merge two of the plurality of regions based on one or more criteria. As an example, the one or more criteria can include whether the two centroids respectively associated with the two regions share a line of sight.

As another example, the merging criteria can include whether a percentage of cells assigned to the two regions that do not have a line of sight is below a threshold number. For example, the line of sight can be to the two current centroids of the regions or to a midpoint between the two centroids of the regions. Alternatively or additionally, a raw number of cells having no line of sight can be used instead of a percentage.

As yet another example, the criteria upon which it is determined whether to merge two of the regions can include whether all of a plurality of boundary cells associated with the two regions have a line of sight to a midpoint between the two centroids of the region. For example, if all cells that are on a boundary of either of the two regions have a line of sight to the midpoint between the two centroids, then the two regions are likely portions of a single room and, therefore, can be merged.

If it is determined that two regions should be merged, then, in some implementations, the midpoint between the two centroids of the two regions can be designated as the centroid for both regions and all cells of the two regions can be assigned to such new midpoint. However, in other implementations, the centroid of the new merged region can be determined in other fashions.

At (318) it can be determined whether to introduce a new centroid based on one or more criteria. As an example, the one or more criteria can include an aggregate cost associated with all of the plurality of regions. For example, the aggregate cost associated with all of the plurality of regions can be based in part on a number of cells that do not have a line of sight to the centroid to which they are respectively assigned.

In particular, in some implementations, the aggregate cost can be the sum of a plurality of new centroid costs respectively associated with the plurality of regions. For example, the new centroid cost associated with each region can be the number of cells included in such region that do not have a line of sight to the region centroid multiplied by the cost associated with the cell in such region having the highest cost as determined according to the cost formula.

Thus, in some implementations, if the aggregate cost is greater than a threshold value, then it can be determined that a new centroid should be added. However, in other implementations a new centroid can be added based on other criteria or can be added at (318) as a matter of course.

If it is determined that a new centroid should be added, then the new centroid can be initialized and can affect the assignment of cells at the next assignment iteration. As an example, in some implementations, the new centroid can be added by identifying the region having the greatest new centroid cost. The cell having the greatest cost within such identified region can be designated as the new centroid.

It will be appreciated that the determinations performed at (316) and (318) may or may not be sequential in nature. As an example, in some implementations, an artificial intelligence search technique, such as, for example, branch and bound, can be employed to fan out different results as a tree. A preferred result of the search technique can then be identified and implemented.

At (320) it can be determined whether an improvement value is less than a threshold value. For example, the improvement value can describe an iteration-over-iteration reduction in cost associated with one or more cells of the occupancy grid (e.g. a reduction resulting from the most recently performed assignment iteration).

As an example, in some implementations, the improvement value can equal or otherwise be based on an absolute value of the cost associated with the cell having received the largest cost value according to the cost formula in the most recent assignment iteration minus the cost associated with the cell having received the largest cost value according to the cost formula in the penultimate assignment iteration. However, other formulations of the improvement value can be used as well, including, for example, a moving average of the improvement value.

If it is determined at (320) that the improvement value is not less than the threshold value, then method (300) can return to (308) and perform steps (308)-(318) again. Thus, steps (308)-(318) can be iteratively performed until the improvement value is less than the threshold value. In such fashion, the region assignments can converge upon a satisfactory result or a minimized cost (e.g. continued iterations will not result in significant enhancement of region extraction).

However, if it is determined at (320) that the improvement value is less than the threshold value, then method (320) can proceed to (322). At (322) the occupancy grid having the most recent region assignments can be output as an indoor map.

In particular, at (322) the most recent set of cell assignments and regions of the occupancy grid can be output as an indoor map having a plurality of designated regions. For example, each cell of the map can have a region index from 1 to N for N regions or a 0 representing occupied space (e.g. obstacles).

Figure 6:
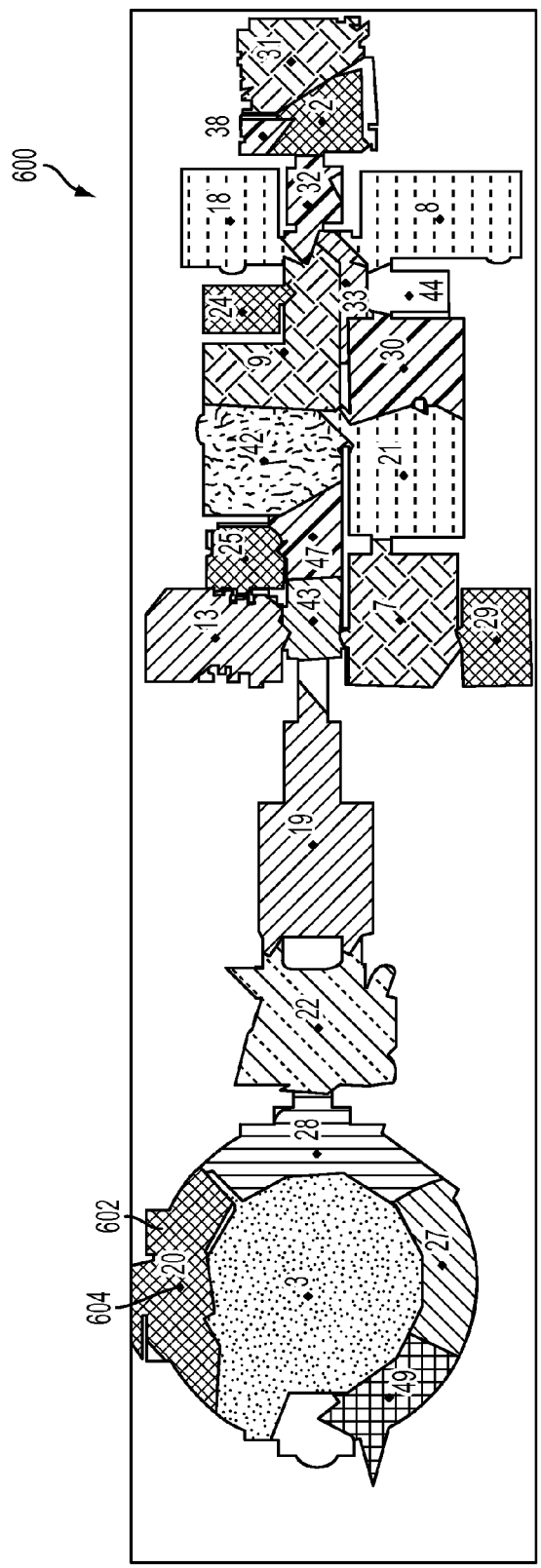
FIG. 6 depicts an example indoor map according to an example embodiment of the present disclosure.

As an example, FIG. 6 depicts an example indoor map 600 according to an example embodiment of the present disclosure. In particular, indoor map 600 has been generated according to the present disclosure from occupancy grid 450 of FIG. 4B.

Indoor map 600 can provide, for each cell of the map 600, a region index from 1 to N for N regions or a 0 representing occupied space (e.g. obstacles). As an example, cell 602 is included in region 20, which has a centroid at cell 604.

Thus, the systems and methods of the present disclosure can be implemented to automatically extract regions from an occupancy grid and generate an indoor map with a plurality of designated regions. The resulting indoor map and regions can then be used for many different purposes, including, for example, detection of doors and windows, region connectivity, robotic navigation, energy efficient lighting or heating, pathway prediction, semantic representations of floorplans, or other functions.

Example Systems

Figure 7:
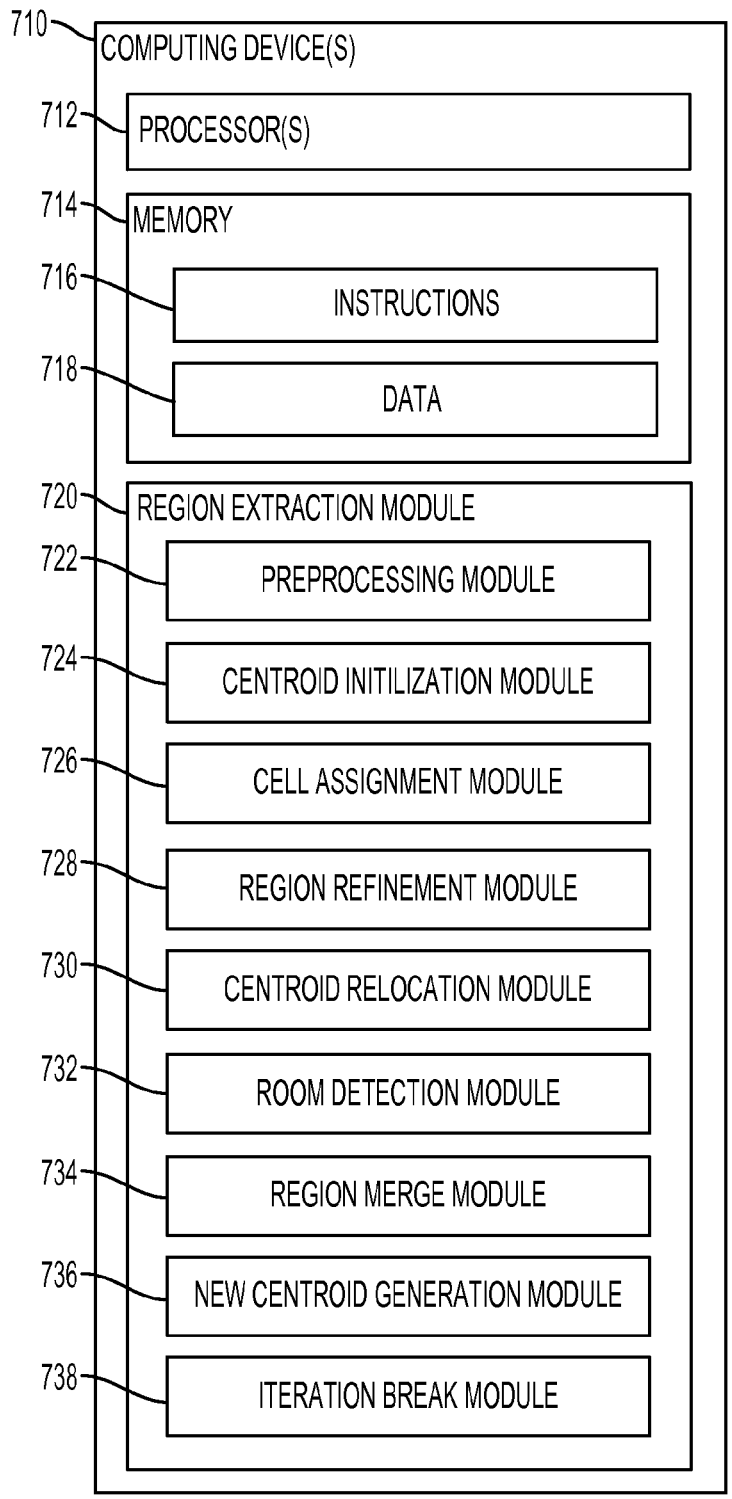
FIG. 7 depicts an example system according to an example embodiment of the present disclosure.

FIG. 7 depicts an example system 700 according to an example embodiment of the present disclosure. System 700 can include one or more computing devices 710. In the instance that system 700 includes a plurality of computing devices 710, the plurality of computing devices 710 can perform any computing or processing operations according to any suitable computer architectures, including parallel computing architectures, sequential computing architectures, or some combination thereof.

Computing devices 710 can include one or more processors 712 and a memory 714. The processor(s) 712 can be any suitable processing device, such as a microprocessor, microcontroller, integrated circuit, or other suitable processing device. The memory 714 can include any suitable computing system or media, including, but not limited to, non-transitory computer-readable media, RAM, ROM, hard drives, flash drives, or other memory devices, or combinations thereof. The memory 714 can store information accessible by processor(s) 712, including instructions that can be executed by processor(s) 712. The instructions can be any set of instructions that when executed by the processor(s) 712, cause the processor(s) 712 to provide desired functionality.

According to an aspect of the present disclosure, the one or more computing devices 710 can include a region extraction module 720. Region extraction module 720 can be implemented to extract regions from an occupancy grid according to the teachings of the present disclosure. As an example, region extraction module 720 can be implemented to perform some or all of method (300) of FIG. 3.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Region extraction module 720 can include a preprocessing module 722; a centroid initialization module 724; a cell assignment module 726; a region refinement module 728; a centroid relocation module 730; a room detection module 732; a region merge module 734; a new centroid generation module 736; and an iteration break module 738.

Preprocessing module 722 can be implemented to pre-process an occupancy grid or occupancy grid precursor. For example, preprocessing the occupancy grid can include thresholding the occupancy probabilities of the grid cells to a binary system, removing on or more small occupied components or clusters of such components, or other actions. As an example, preprocessing module 722 can be implemented to perform aspects of (304) of method (300) of FIG. 3.

Centroid initialization module 724 can be implemented to initialize a plurality of centroids. For example, a random number or a predetermined number of centroids can be initialized. The spacing of the initialized centroids can also be randomized or can be evenly distributed in one or more patterns. As an example, centroid initialization module 724 can be implemented to perform aspects of (306) of method (300) of FIG. 3.

Cell assignment module 726 can be implemented to respectively assign a plurality of cells to a plurality of centroid to generate a plurality of regions. For example, the cells can be assigned according to a cost formula that provides a cost based on one or more variables. As an example, cell assignment module 726 can be implemented to perform aspects of (308) of method (300) of FIG. 3.

Region refinement module 728 can be implemented to refine one or more regions. For example, region refinement module 728 can be implemented to reassign one or more cells to one or more respective alternate regions. The one or more reassigned cells can have been included in one or more problem areas of one or more of the plurality of regions. As an example, region refinement module 728 can be implemented to perform aspects of (310) of method (300) of FIG. 3.

Centroid relocation module 730 can be implemented to relocate one or more centroids of one or more regions. For example, the relocated centroids can be relocated so that they correspond to the respective means of their regions. As an example, centroid relocation module 730 can be implemented to perform aspects of (312) of method (300) of FIG. 3.

Room detection module 732 can be implemented to determine whether one or more regions correspond to a detected room. Furthermore, when it is determined that one or more regions correspond to a detected room, room detection module 732 can be implemented to lock the cell assignments respectively associated with each the one or more regions corresponding to detected rooms. As an example, room detection module 732 can be implemented to perform aspects of (314) of method (300) of FIG. 3.

Region merge module 734 can be implemented to merge two or more regions when certain criteria are met. As an example, region merge module 734 can be implemented to perform aspects of (316) of method (300) of FIG. 3.

New centroid generation module 736 can be implemented to determine whether a new centroid should be added. Furthermore, when it is determined that a new centroid should be added, new centroid generation module 736 can be implemented to determine the appropriate location of the new centroid. As an example, new centroid generation module 736 can be implemented to perform aspects of (318) of method (300) of FIG. 3.

Iteration break module 738 can be implemented to determine whether to cease performing iterations in an iterative method, such as, for example, method (300) of FIG. 3. For example, iteration break module 738 can be implemented to calculate an improvement value that describes a reduction in cost associated with one or more cells. The reduction in cost having resulted from the most recently performed iteration. Thus, as an example, iteration break module 738 can be implemented to perform aspects of (320) of method (300) of FIG. 3.

The technology discussed herein makes reference to computing devices, databases, software applications, and other computer-based systems, as well as actions taken by and information sent to and from such systems. One of ordinary skill in the art will recognize that the inherent flexibility of computer-based systems allows for a great variety of possible configurations, combinations, and divisions of tasks and functionality between and among components. For instance, computing processes discussed herein may be implemented using a single computing device or multiple computing devices working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for region extraction, the method comprising:
   obtaining, by one or more computing devices, an occupancy grid comprising a first plurality of cells;
   designating, by the one or more computing devices, a second plurality of cells as a plurality of centroids, the second plurality of cells being a subset of the first plurality of cells; and
   performing, by the one or more computing devices, a plurality of assignment iterations, each assignment iteration comprising:
      assigning, by the one or more computing devices, each of the first plurality of cells to one of the plurality of centroids based on a cost formula such that a plurality of regions respectively associated with the plurality of centroids are formed, wherein the region for each centroid comprises all of the cells assigned to such centroid;
      reassigning, by the one or more computing devices, one or more of the first plurality of cells to one or more respective alternate regions, the one or more reassigned cells having been included in one or more problem areas of one or more of the plurality of regions; and
      relocating, by the one or more computing devices, the plurality of centroids to be the respective means of the plurality of regions.

2. The method of claim 1, wherein reassigning, by the one or more computing devices, one or more of the first plurality of cells to one or more respective alternate regions comprises reassigning each of the one or more reassigned cells to the region that is respectively closest to such cell.

3. The method of claim 1, wherein reassigning, by the one or more computing devices, one or more of the first plurality of cells to one or more respective alternate regions comprises:
   identifying, by the one or more computing devices, one or more boundary lines for each of the plurality of regions;
   identifying, by the one or more computing devices, one or more problem areas defined by two or more open and connected boundary lines;
   reassigning, by the one or more computing devices, each cell included in the or more problem areas to the region that is respectively closest to such cell.

4. The method of claim 1, wherein reassigning, by the one or more computing devices, one or more of the first plurality of cells to one or more respective alternate regions comprises:
   identifying, by the one or more computing devices, one or more problem areas that are disconnected from the centroid to which they are assigned; and
   reassigning, by the one or more computing devices, each cell included in the one or more problem areas to the region that is respectively closest to such cell.

5. The method of claim 1, wherein the cost formula provides a cost for each cell and each centroid based at least in part on whether a line of sight exists between such cell and such centroid and a distance between such cell and such centroid.

6. The method of claim 1, wherein:
   each assignment iteration further comprises determining, by the one or more computing devices, whether to cease performing assignment iterations based at least in part on an improvement value; and
   the improvement value describes a reduction in cost associated with one or more of the first plurality of cells, the reduction in cost having resulted from the most recently performed assignment iteration.

7. The method of claim 6, wherein the improvement value comprises the absolute value of the cost associated with the cell having received the largest cost value according to the cost formula in the most recent assignment iteration minus the cost associated with the cell having received the largest cost value according to the cost formula in the penultimate assignment iteration.

8. The method of claim 1, wherein each assignment iteration further comprises:
analyzing, by the one or more computing devices, each of the plurality of regions to determine whether one or more of the plurality of regions correspond to a detected room; and
when it is determined that one or more of the regions correspond to a detected room, locking the cell assignments respectively associated with each the one or more regions corresponding to detected rooms.

9. The method of claim 1, further comprising, prior to performing the plurality of assignment iterations, preprocessing, by the one or more computing devices, the occupancy grid by removing one or more occupied components having a length less than a threshold value.

10. The method of claim 1, wherein:
the occupancy grid specifies an occupancy probability for each of the first plurality of cells;
the method further comprises, prior to performing the plurality of assignment iterations, preprocessing, by the one or more computing devices, the occupancy grid by setting to one the occupancy probability of any cell having an occupancy probability greater than a threshold value and by setting to zero the occupancy probability of any cell having an occupancy probability less than the threshold value.

11. One or more non-transitory computer-readable media storing instructions that, when executed by one or more computing devices, cause the one or more computing devices to perform operations, the operations comprising:
obtaining an occupancy grid comprising a first plurality of cells;
designating a second plurality of cells as a plurality of centroids, the second plurality of cells being a subset of the first plurality of cells; and
performing a plurality of assignment iterations, each assignment iteration comprising:
assigning each of the first plurality of cells to one of the plurality of centroids based on a cost formula such that a plurality of regions are formed, the plurality of regions respectively corresponding to the cells assigned to the plurality of centroids;
relocating the plurality of centroids to be the respective means of the plurality of regions;
analyzing each of the plurality of regions to determine whether one or more of the plurality of regions correspond to a detected room; and
when it is determined that one or more of the regions correspond to a detected room, locking the cell assignments respectively associated with each the one or more regions corresponding to detected rooms.

12. The computer-readable media of claim 11, wherein analyzing each of the plurality of regions to determine whether one or more of the plurality of regions correspond to a detected room comprises:
determining one or more of an open line ratio, an open boundary length ratio, or an area-to-perimeter ratio for each of the plurality of regions; and
determining whether each of the plurality of regions corresponds to a detected room based at least in part on one or more of the open line ratio, the open boundary length ratio, or the area-to-perimeter ratio associated with such region.

13. The computer-readable media of claim 11, wherein analyzing each of the plurality of regions to determine whether one or more of the plurality of regions correspond to a detected room comprises:
determining for each of the plurality of regions a number of iterations for which the centroid for such region has not relocated; and
determining whether each of the plurality of regions corresponds to a detected room based at least in part on the number of iterations for which the centroid for such region has not relocated.

14. The computer-readable media of claim 11, wherein each assignment iteration further comprises reassigning one or more of the first plurality of cells to one or more respective alternate regions, the one or more reassigned cells having being included in one or more problem areas of one or more of the plurality of regions, and wherein the one or more problem areas are disconnected from the centroid to which they were previously assigned or are defined by two or more open and connected boundary lines.

15. A computing system for performing region extraction, the computing system comprising:
one or more computing devices; and
one or more computer-readable media storing instructions that, when executed by the one or more computing devices, cause the one or more computing devices to perform operations, the operations comprising:
obtaining an occupancy grid comprising a first plurality of cells;
designating a second plurality of cells as a plurality of centroids, the second plurality of cells being a subset of the first plurality of cells; and
performing a plurality of assignment iterations, each assignment iteration comprising:
assigning each of the first plurality of cells to one of the plurality of centroids based on a cost formula such that a plurality of regions are formed, the plurality of regions respectively corresponding to the cells assigned to the plurality of centroids;
relocating the plurality of centroids to be the respective means of the plurality of regions; and
determining whether to merge two of the plurality of regions.

16. The computing system of claim 15, wherein determining whether to merge two of the plurality of regions comprises determining whether to merge two of the plurality of regions based at least in part on one or more of whether the two centroids respectively associated with the two regions share a line of sight and whether a percentage of cells assigned to the two regions and having no line of sight is below a threshold number.

17. The computing system of claim 15, wherein determining whether to merge two of the plurality of regions comprises:
identifying a midpoint between the two centroids respectively associated with the two regions; and
determining whether to merge the two regions based at least in part on whether all of a plurality of boundary cells associated with the two regions have a line of sight to the midpoint.

18. The computing system of claim 15, wherein each assignment iteration further comprises:
determining whether to introduce a new centroid based at least in part on an aggregate cost associated with all of the plurality of regions;
wherein the aggregate cost associated with all of the plurality of regions is based at least in part on a number of cells that do not have a line of sight to the centroid to which they are respectively assigned.

19. The computing system of claim 15, wherein each assignment iteration further comprises:
- determining whether to introduce a new centroid; and
- when it is determined that a new centroid should be introduced:
  - determining, by the one or more computing devices, a new centroid cost for each of the plurality of regions;
  - identifying, by the one or more computing devices, the region having the greatest new centroid cost;
  - identifying, by the one or more computing devices, a first cell having the greatest cost according to the cost formula with respect to all cells assigned to the region having the greatest new centroid cost; and
  - designating, by the one or more computing devices, the first cell as a new centroid.

20. The computing system of claim 19, wherein the new centroid cost for each of the plurality of regions is based at least in part on a number of cells that are assigned to such region and do not have a line of sight to the centroid of such region.

* * * * *